United States Patent
Mantell et al.

(10) Patent No.: US 11,383,417 B2
(45) Date of Patent: Jul. 12, 2022

(54) FILAMENT HEATERS CONFIGURED TO FACILITATE THERMAL TREATMENT OF FILAMENTS FOR EXTRUDER HEADS IN THREE-DIMENSIONAL OBJECT PRINTERS

(71) Applicant: Xerox Corporation, Norwalk, CT (US)

(72) Inventors: David A. Mantell, Rochester, NY (US); Peter J. Nystrom, Webster, NY (US); Christopher G. Lynn, Wolcott, NY (US); Jun Ma, Penfield, NY (US); Mark A. Cellura, Webster, NY (US); Gary D. Redding, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 45 days.

(21) Appl. No.: 17/007,881

(22) Filed: Aug. 31, 2020

(65) Prior Publication Data

US 2020/0398476 A1 Dec. 24, 2020

Related U.S. Application Data

(62) Division of application No. 15/334,851, filed on Oct. 26, 2016, now Pat. No. 10,814,544.

(51) Int. Cl.

| | |
|---|---|
| *B29C 48/80* | (2019.01) |
| *B29C 48/00* | (2019.01) |
| *B29C 48/29* | (2019.01) |
| *B29C 48/36* | (2019.01) |
| *B29C 64/106* | (2017.01) |
| *B29C 48/92* | (2019.01) |
| *B29C 64/295* | (2017.01) |
| *B29C 64/209* | (2017.01) |
| *B33Y 70/00* | (2020.01) |

(Continued)

(52) U.S. Cl.
CPC .......... *B29C 48/802* (2019.02); *B29C 48/022* (2019.02); *B29C 48/29* (2019.02); *B29C 48/36* (2019.02); *B29C 48/92* (2019.02); *B29C 64/106* (2017.08); *B29C 64/209* (2017.08); *B29C 64/295* (2017.08); *B33Y 70/00* (2014.12); *B29C 2948/926* (2019.02); *B29K 2101/12* (2013.01); *B33Y 30/00* (2014.12)

(58) Field of Classification Search
CPC ..... B29C 48/022; B29C 48/92; B29C 64/106; B29C 64/209; B29C 64/295; B29C 2948/926; B33Y 70/00; B33Y 30/00; B29K 2101/12

See application file for complete search history.

(56) References Cited

U.S. PATENT DOCUMENTS

| | | |
|---|---|---|
| 2014/0291886 A1 | 10/2014 | Mark et al. |
| 2014/0314954 A1 | 10/2014 | Lewis et al. |

(Continued)

*Primary Examiner* — Michael M. Robinson
(74) *Attorney, Agent, or Firm* — Maginot Moore Beck LLP

(57) ABSTRACT

An additive manufacturing system includes a heater for converting a filament of extrusion material into thermoplastic material. The heater has a channel configured to change the cross-sectional shape of the filament to a cross-sectional shape that has a greater surface area than the surface area of the filament before the heater receives the filament. The channel of the heater can also be configured to drive the center portion of the filament toward the heated walls of the channel and to mix thermoplastic material in the channel while exposing the center portion of the filament to the heated wall of the channel.

15 Claims, 6 Drawing Sheets

(51) Int. Cl.
 B33Y 30/00 (2015.01)
 B29K 101/12 (2006.01)

(56) References Cited

U.S. PATENT DOCUMENTS

| | | | |
|---|---|---|---|
| 2016/0136897 A1* | 5/2016 | Nielsen-Cole | B29C 48/02 |
| | | | 425/131.1 |
| 2016/0263822 A1 | 9/2016 | Boyd, IV | |
| 2016/0325498 A1 | 11/2016 | Gelbart | |
| 2018/0056608 A1* | 3/2018 | Dunn | B29C 64/30 |

\* cited by examiner

FILAMENT HEATERS CONFIGURED TO FACILITATE THERMAL TREATMENT OF FILAMENTS FOR EXTRUDER HEADS IN THREE-DIMENSIONAL OBJECT PRINTERS

PRIORITY CLAIM

This disclosure application is a divisional of and claims priority to U.S. patent application Ser. No. 15/334,851, which was filed on Oct. 26, 2016, is entitled "Filament Heaters Configured To Facilitate Thermal Treatment Of Filaments For Extruder Heads In Three-Dimensional Object Printers," and which issued as U.S. Pat. No. 10,814,544 on Oct. 27, 2020. The disclosure of this document is hereby expressly incorporated herein by reference.

TECHNICAL FIELD

This disclosure is directed to extruders used in three-dimensional object printers and, more particularly, to heaters that melts filaments for extrusion in three-dimensional object printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruder heads that soften or melt extrusion material, such as ABS plastic, into thermoplastic material and then emit the thermoplastic material in a predetermined pattern. The printer typically operates the extruder head to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

These additive manufacturing devices can produce highly functional three-dimensional (3D) parts, but typically the time of manufacture can be quite lengthy. One improvement that speeds the manufacturing process was the development of a multi-channel extruder. In this type of extruder, a filament of extruder material is fed to a heater that either melts or softens the filament to form thermoplastic material that flows into a manifold that is fluidly connected to an array of nozzles for the extrusion of the thermoplastic material. A valve is interposed between each nozzle and the manifold to control thermoplastic flow from the manifold to one of the nozzles. This configuration enables the valves to be activated selectively so the thermoplastic material can be extruded from a single nozzle, a group of nozzles, or all of the nozzles fluidly connected to the manifold. In order to supply the thermoplastic material on demand as the valves are operated requires high pressure within the manifold and the production of thermoplastic material at a much faster than is available from a heater for a standard extruder. The volume of thermoplastic material produced for an extruder head can be increased by processing larger diameter filament, but the amount of time needed to thermally treat the thicker filament would also be increased. A filament heater that can increase the production of thermoplastic material for an extruder head without extending the length of thermal treatment time would be beneficial.

SUMMARY

A new additive manufacturing system incorporates a heater that is configured to enable extrusion material filaments to be thermally processed without extending the length of time required to thermally treat the filament. The additive manufacturing system includes an extruder head having a manifold configured to store thermoplastic material and at least one nozzle through which thermoplastic material from the manifold can be emitted, a mechanical mover configured to move extrusion material from a supply of extrusion material along a path, the extrusion material having a first cross-sectional shape, and a heater having a channel positioned along the path of the extrusion material to receive the extrusion material and at least one heating element configured to melt the extrusion material in the channel to form thermoplastic material, the channel in the heater being fluidly connected to the manifold in the extruder head to enable the thermoplastic material to enter the manifold and the channel in the heater is configured with the first cross-sectional shape at a first position and with a second cross-sectional shape at a second position, the second cross-sectional shape being different than the first cross-sectional shape, to enable the channel in the heater to increase a surface area of the filament.

A heater has been configured to enable extrusion material filaments to be thermally processed without extending the length of time required to thermally treat the filament. The heater includes a body having a channel, the channel in the heater body being configured with a first cross-sectional shape at a first position and with a second cross-sectional shape at a second position, the second cross-sectional shape being different than the first cross-sectional shape, to enable the channel in the heater to increase a surface area of extrusion material that passes through the channel from the first position to the second position, and at least one heating element positioned in the body to generate heat in the channel and melt the extrusion material to form thermoplastic material.

BRIEF DESCRIPTION OF THE DRAWINGS

The foregoing aspects and other features of a heater that thermally processes filaments into thermoplastic material for extruder heads are explained in the following description, taken in connection with the accompanying drawings.

DETAILED DESCRIPTION

Figure 1:
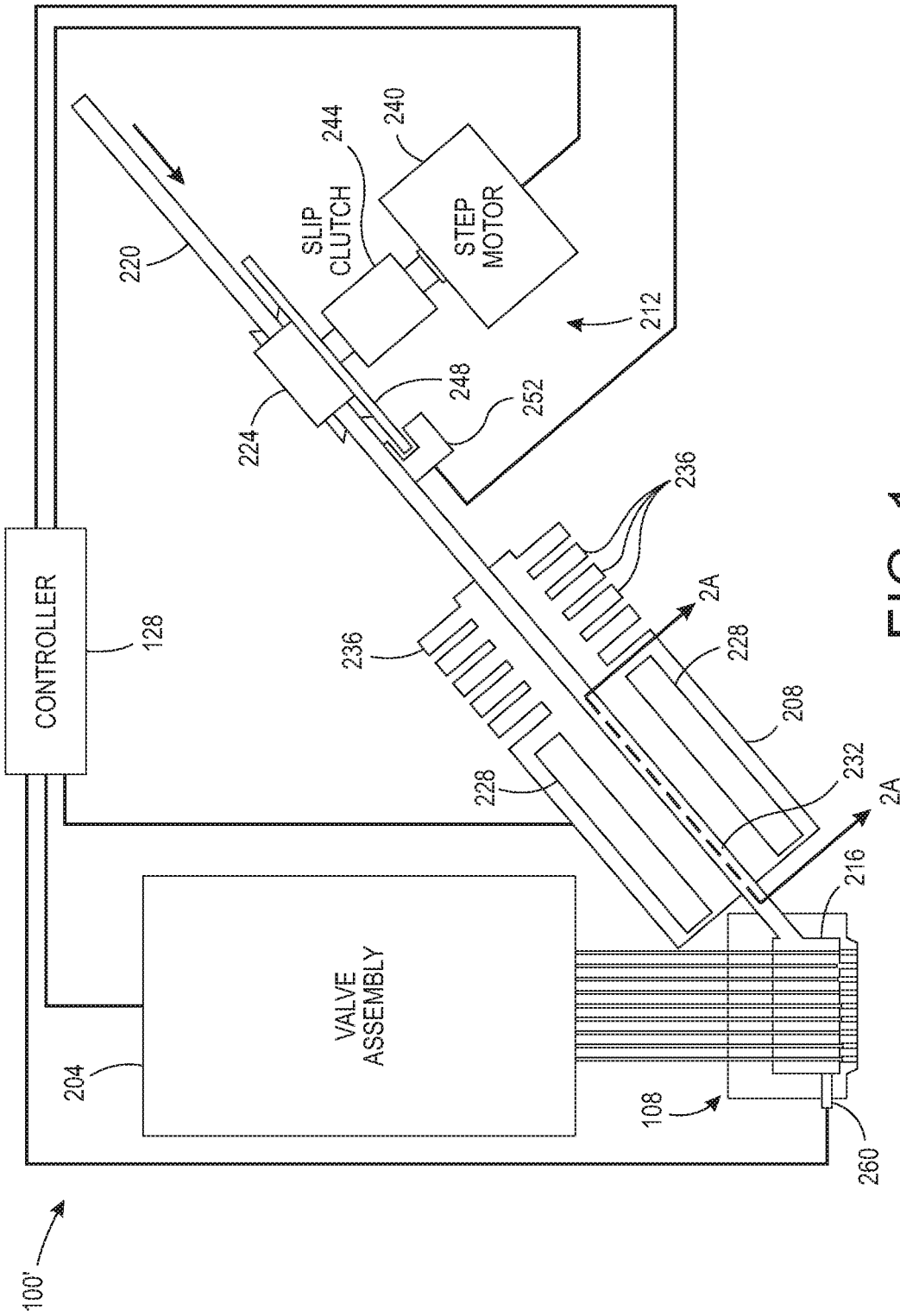
FIG. 1 depicts an additive manufacturing system that includes a heater that improves the thermal treatment of filaments for the provision of thermoplastic material to a manifold of an extruder head.

For a general understanding of the environment for the device disclosed herein as well as the details for the device, reference is made to the drawings. In the drawings, like reference numerals designate like elements.

As used herein, the term "extrusion material" refers to a material that is softened or melted to form thermoplastic material to be emitted by an extruder head in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder head. Examples of support materials include, but are not limited to, high-impact polystyrene (HIPS), polyvinyl alcohol (PVA), and other materials capable of extrusion after being thermally treated. In some extrusion printers, the extrusion material is supplied as a continuous elongated strand of material commonly known as a "filament." This filament is provided in a solid form by one or more rollers pulling the extrusion material filament from a spool or other supply and feeding the filament into a heater that is fluidly connected to a manifold within the extruder head. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in a printhead during operation of a three-dimensional object printer. The melted extrusion material is also denoted as "thermoplastic material" in this document. As those of skill in the art recognize, certain amorphous extrusion materials do not transition to a pure liquid state during operation of the printer.

As used herein, the term "manifold" refers to a cavity formed within a housing of an extruder head that holds a supply of thermoplastic material for delivery to one or more nozzles in the printhead during a three-dimensional object printing operation. As used herein, the term "extruder head" refers to a component of a printer that extrudes melted extrusion material received from a manifold through one or more nozzles. Some extruder heads include a valve assembly that can be electronically operated to enable thermoplastic material to flow through nozzles selectively. The valve assembly enables the independent connecting of one or more nozzles to the manifold to extrude the thermoplastic material. As used herein, the term "nozzle" refers to an orifice in an extruder head that is fluidly connected to the manifold in an extruder head and through which thermoplastic material is emitted toward an image receiving surface. During operation, the nozzle extrudes a substantially continuous linear arrangement of the thermoplastic material along the process path of the extruder head. A controller operates the valves in the valve assembly to control which nozzle connected to the valve assembly extrudes thermoplastic material. The diameter of the nozzle affects the width of the line of extruded thermoplastic material. Different extruder head embodiments include nozzles having a range of orifice sizes with wider orifices that produce ribbons of thermoplastic material having widths that are greater than the widths of ribbons produced by narrower orifices.

As used herein, the term "arrangement of extrusion material" refers to any pattern of thermoplastic material that the extruder head forms on an image receiving surface during a three-dimensional object printing operation. Common arrangements of thermoplastic material include straight-line linear arrangements of the thermoplastic material and curved arrangements of the thermoplastic material. In some configurations, the extruder head extrudes the thermoplastic material in a continuous manner to form the arrangement with a contiguous mass of the thermoplastic material while in other configurations the extruder head operates in an intermittent manner to form smaller groups of thermoplastic material that are arranged along a linear or curved path. The three-dimensional object printer forms various structures using combinations of different arrangements of thermoplastic material. Additionally, a controller in the three-dimensional object printer uses object image data and extruder head path data that correspond to different arrangements of thermoplastic material to operate the extruder head and form each arrangement of the extrusion material. As described below, the controller optionally adjusts the operation of the valve assembly to form multiple arrangements of thermoplastic material through one or more nozzles during a three-dimensional printing operation.

As used herein, the term "process direction" refers to a direction of relative movement between an extruder head and an image receiving surface that receives thermoplastic material extruded from one or more nozzles in the head. The image receiving surface is either a support member that holds a three-dimensional printed object or a surface of the partially formed three-dimensional object during an additive manufacturing process. In the illustrative embodiments described herein, one or more actuators move the extruder head about the support member, but alternative system embodiments move the support member to produce the relative motion in the process direction while the extruder head remains stationary.

As used herein, the term "cross process direction" refers to an axis that is perpendicular to the process direction in the plane of the process direction and is also perpendicular to the surface of the three-dimensional object being produced. The process direction and cross-process direction refer to the relative path of movement of the extruder head and the surface that receives the thermoplastic material. In some configurations, the extruder head includes an array of nozzles that extend along the cross-process direction. Adjacent nozzles within the extruder head are separated by a predetermined distance in the cross-process direction. In some configurations the system rotates the extruder head to adjust the effective cross-process direction distance between adjacent nozzles in the extruder head to adjust the corresponding cross-process direction distance between arrangements of the thermoplastic material extruded from the nozzles in the extruder head.

During operation of the additive manufacturing system, an extruder head moves in the process direction along both straight and curved paths relative to a surface that receives thermoplastic material during the three-dimensional object printing process. Additionally, an actuator in the system optionally rotates the extruder head about the Z axis to adjust the effective cross-process distance that separates nozzles in the extruder head to enable the extruder head to form two or more arrangements of thermoplastic material with predetermined distances between each arrangement of the thermoplastic material. The extruder head moves both along the outer perimeter to form outer walls of a region in a layer of the printed object and within the perimeter to fill all or a portion of the region with thermoplastic material. The extruder head forming the arrangements can move through any planar or rotational degree of freedom provided the processing of the image data for the three-dimensional object is adequate to generate the data for operating the extruder head.

Figure 7:
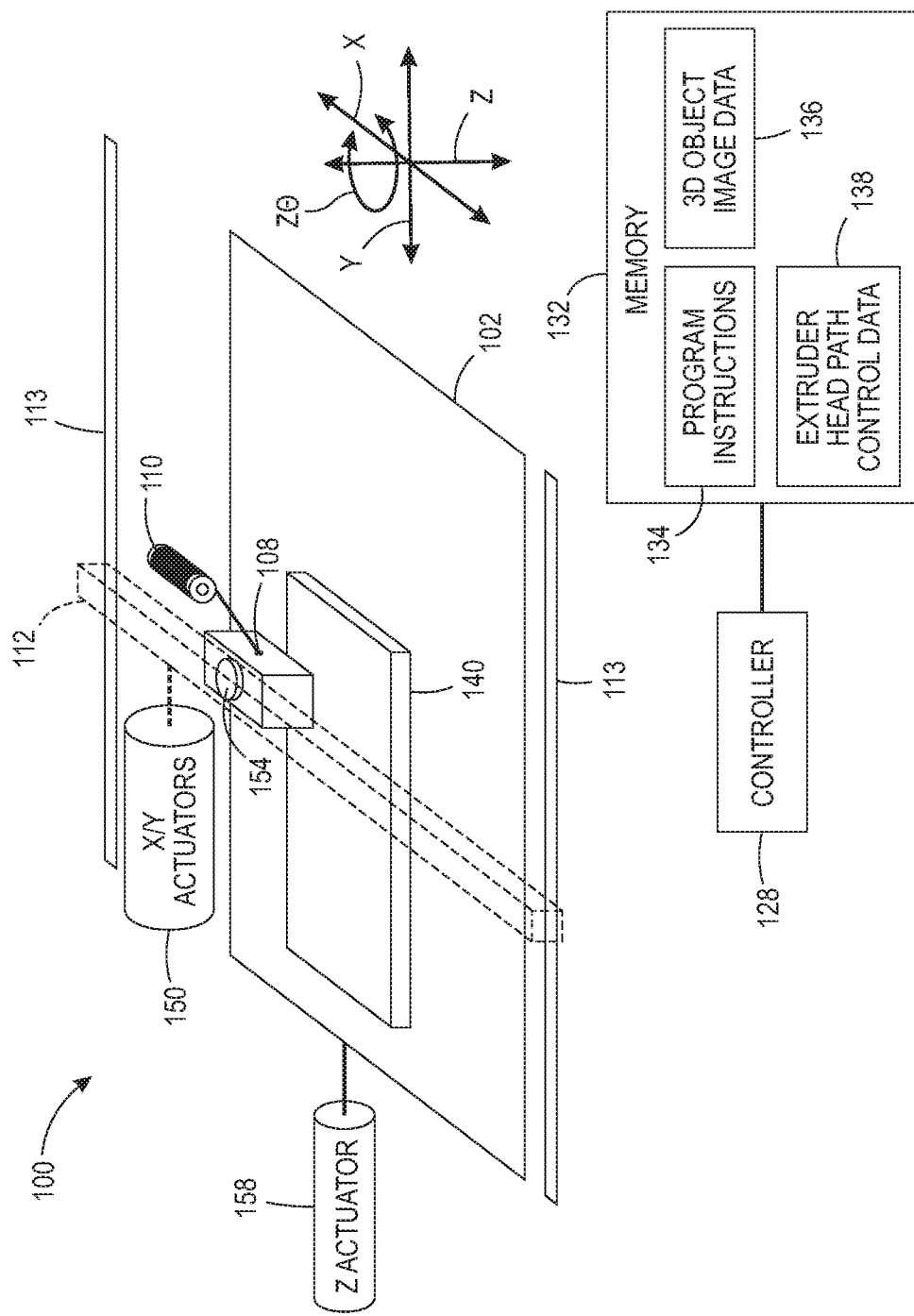
FIG. 7 is a diagram of a prior art three-dimensional object printer having a multi-nozzle extrusion printhead that does not have the solid extrusion material feeding system of FIG. 1.

FIG. 7 depicts a prior art three-dimensional object additive manufacturing system or printer 100 that is configured to operate an extruder head 108 to form a three-dimensional printed object 140. Although the printer 100 is depicted as a printer that uses planar motion to form an object, other printer architectures can be used with the extruder head and mechanical mover of extrusion material described in this document. These architectures include delta-bots, selective compliance assembly robot arms (SCARAs), multi-axis printers, non-Cartesian printers, and the like. The printer 100 includes a support member 102, a multi-nozzle extruder head 108, extruder head support arm 112, controller 128, memory 132, X/Y actuators 150, an optional Zθ actuator 154, and a Z actuator 158. In the printer 100, the X/Y actuators 150 move the extruder head 108 to different locations in a two-dimensional plane (the "X-Y plane") along the X and Y axes to extrude arrangements of thermoplastic material that form one layer in a three-dimensional printed object, such as the object 140 that is depicted in FIG. 7. For example, in FIG. 7 the X/Y actuators 150 translate the support arm 112 and extruder head 108 along guide rails 113 to move along the Y axis while the X/Y actuators 150 translate the extruder head 108 along the length of the support arm 112 to move the printhead along the X axis. The extruded patterns include both outlines of one or more regions in the layer and swaths of the thermoplastic material that fill in the regions within the outline of thermoplastic material patterns. The Z actuator 158 controls the distance between the extruder head 108 and the support member 102 along the Z axis to ensure that the nozzles in the extruder head 108 remain at a suitable height to extrude thermoplastic material onto the object 140 as the object is formed during the printing process. The Zθ actuator 154 controls an angle of rotation of the extruder head 108 about the Z axis (referenced as Zθ in FIG. 4) for some embodiments of the extruder head 108 that rotate about the Z axis. This movement controls the separation between nozzles in the extruder head 108, although some extruder heads do not require rotation during the manufacturing process. In the system 100, the X/Y actuators 150, Zθ actuator 154, and the Z actuator 158 are embodied as electromechanical actuators, such as electric motors, stepper motors, or any other suitable electromechanical device. In the illustrative embodiment of FIG. 7, the three-dimensional object printer 100 is depicted during formation of a three-dimensional printed object 140 that is formed from a plurality of layers of thermoplastic material.

The support member 102 is a planar member, such as a glass plate, polymer plate, or foam surface, which supports the three-dimensional printed object 140 during the manufacturing process. In the embodiment of FIG. 7, the Z actuator 158 also moves the support member 102 in the direction Z away from the extruder head 108 after application of each layer of thermoplastic material to ensure that the extruder head 108 maintains a predetermined distance from the upper surface of the object 140. The extruder head 108 includes a plurality of nozzles and each nozzle extrudes thermoplastic material onto the surface of the support member 102 or a surface of a partially formed object, such the object 140. In the example of FIG. 7, extrusion material is provided as a filament from extrusion material supply 110, which is a spool of ABS plastic or another suitable extrusion material filament that unwraps from the spool to supply extrusion material to the extruder head 108.

The support arm 112 includes a support member and one or more actuators that move the extruder head 108 during printing operations. In the system 100, one or more actuators 150 move the support arm 112 and extruder head 108 along the X and Y axes during the printing operation. For example, one of the actuators 150 moves the support arm 112 and the extruder head 108 along the Y axis while another actuator moves the extruder head 108 along the length of the support arm 112 to move along the X axis. In the system 100, the X/Y actuators 150 optionally move the extruder head 108 along both the X and Y axes simultaneously along either straight or curved paths. The controller 128 controls the movements of the extruder head 108 in both linear and curved paths that enable the nozzles in the extruder head 108 to extrude thermoplastic material onto the support member 102 or onto previously formed layers of the object 140. The controller 128 optionally moves the extruder head 108 in a rasterized motion along the X axis or Y axis, but the X/Y actuators 150 can also move the extruder head 108 along arbitrary linear or curved paths in the X-Y plane.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102 and the support arm 112. The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and three-dimensional (3D) object image data 136. The controller 128 executes the stored program instructions 134 to operate the components in the printer 100 to form the three-dimensional printed object 140 and print two-dimensional images on one or more surfaces of the object 140. The 3D object image data 136 includes, for example, a plurality of two-dimensional image data patterns that correspond to each layer of thermoplastic material that the printer 100 forms during the three-dimensional object printing process. The extruder head path control data 138 include a set of geometric data or actuator control commands that the controller 128 processes to control the path of movement of the extruder head 108 using the X/Y actuators 150 and to control the orientation of the extruder head 108 using the Zθ actuator 154. The controller 128 operates the actuators to move the extruder head 108, FIG. 1 depicts an additive manufacturing system 100' that includes a valve assembly 204 in the extruder head 108 that is operatively connected to the controller 128 to enable control of the operation of the valves and the material emitted from the plurality nozzles in the extruder head 108. Specifically, the controller 128 activates and deactivates different valves in the valve assembly 204 connected to the nozzles in the extruder head 108 to emit thermoplastic material and form arrangements of the thermoplastic material in each layer of the three-dimensional printed object 140. System 100' also includes an extrusion material dispensing system 212 that feeds filament from the supply 110 to the heater 208 at a rate that maintains the pressure of the thermoplastic material in the manifold 216 within a predetermined range during operation of the system 100'. The dispensing system 212 is one embodiment that is suitable for regulating pressure of the thermoplastic material in the manifold. Additionally, the controller 128 is operatively connected to an actuator in the dispensing system 212 to control the rate at which the dispensing system 212 delivers solid filament to a heater 208. The heater 208 melts extrusion material filament 220 fed to the heater 208 via drive roller 224. Actuator 240 drives the roller 224 and is operatively connected to the controller 128 so the controller can regulate the speed at which the actuator drives the roller 224. Another roller opposite roller 224 is free-wheeling so it follows the rate of rotation at which roller 224 is driven. While FIG. 1 depicts a feed system that uses an electromechanical actuator and the driver roller 224 as a mechanical mover to move the filament 220 into the heater 208, alternative embodiments use one or more actuators to operate a mechanical mover in the form of a rotating auger or screw. The auger or screw moves solid phase extrusion material in the form of extrusion material powder or pellets into the heater 208.

In the embodiment of FIG. 1, the heater 208 has a body that is formed from stainless steel and in which one or more heating elements 228, such as electrically resistive heating elements, are positioned about a channel 232. The heating elements 228 are operatively connected to the controller 128 so the controller 128 can connect the heating elements 228 to electrical current selectively to melt the filament of extrusion material 220 in channel 232 within the heater 208. While FIG. 1 shows heater 208 receiving extrusion material in a solid phase as solid filament 220, in alternative embodiments, it receives the extrusion material in solid phase as powdered or pelletized extrusion material. Cooling fins 236 attenuate heat in the channel 232 upstream from the heater 208. A portion of the extrusion material that remains solid in the channel 232 at or near the cooling fins 236 forms a seal in the channel 232 that prevents thermoplastic material from exiting the heater from any other opening than the connection to the manifold 216. The extruder head 108 can also include additional heating elements to maintain an elevated temperature for the thermoplastic material within the manifold 216. In some embodiments a thermal insulator covers portions of the exterior of the extruder head 108 to maintain a temperature within the manifold 216.

To maintain a fluid pressure of the thermoplastic material within the manifold 216 within a predetermined range, avoid damage to the extrusion material, and control the extrusion rate through the nozzles, a slip clutch 244 is operatively connected to the drive shaft of the actuator 240. As used in this document, the term "slip clutch" refers to a device applies frictional force to an object to move the object up to a predetermined set point. When the range about the predetermined set point for the frictional force is exceeded, the device slips so it no longer applies the frictional force to the object. The slip clutch enables the force exerted on the filament 220 to remain constant no matter how many valves are opened or how fast the actuator 240 drives roller 224. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252.

The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its speed is slightly faster than the rotation of the roller 224. This operation ensures that the torque on the drive roller 224 is always a function of the slip clutch torque. If one valve/nozzle combination is open, the filament 220 moves slowly. If all of the actuator/valve combinations in the assembly 204 are opened, the filament begins to move more quickly and the controller 128 immediately operates the actuator 240 to increase its speed to ensure that the output shaft of the actuator is turning faster than the speed of the roller 224 indicated by the sensor 252. A delay inherently exists between the force applied to the filament and the pressure of the thermoplastic material in the nozzle region of the extruder header. Empirical data of these delays enable set points to be defined for the slip clutch that enable the slip clutch to be operated to provide more uniform pressure of the thermoplastic material in the nozzle region of the extruder head.

Figure 2A:
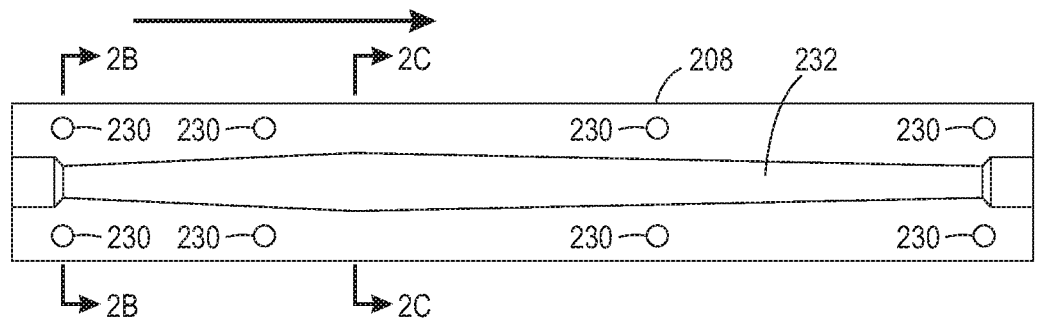
FIG. 2A is a cross-sectional view of the heater of FIG. 1 that improves the thermal treatment of filaments for the provision of thermoplastic material to the manifold of the extruder head of FIG. 1 that is taken along lines 2A-2A.
Figure 2B:
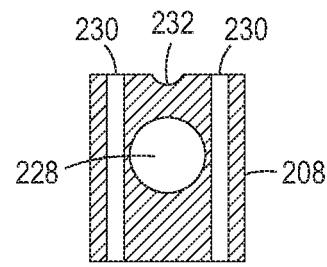
FIG. 2B is a cross-sectional view of the view of the heater shown in FIG. 2A taken along lines 2B-2B.
Figure 2C:
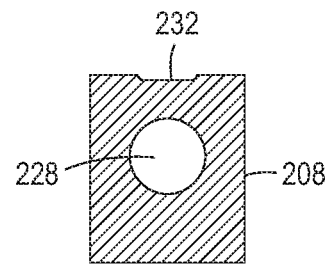
FIG. 2C is a cross-sectional view of the view of the heater shown in FIG. 2A taken along lines 2C-2C.
Figure 3A:
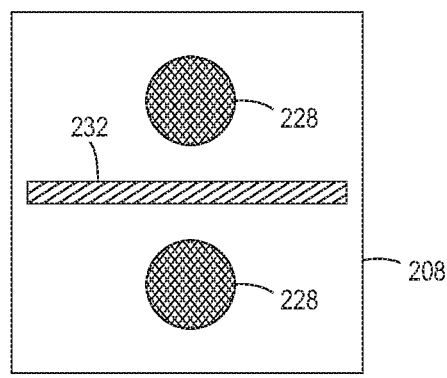
FIG. 3A is an end view of the heater shown in FIG. 1 taken at the position of lines 2C-2C in FIG. 2A.
Figure 3B:
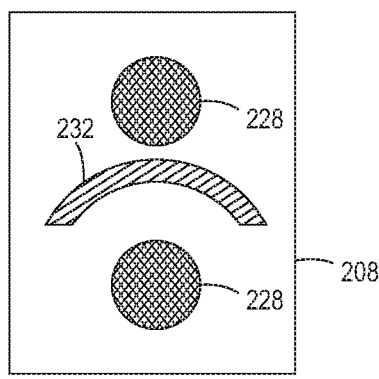
FIG. 3B is an end view of an alternative embodiment of the heater at the same position at which FIG. 3A was taken that reduces the width of the heater.
Figure 3C:
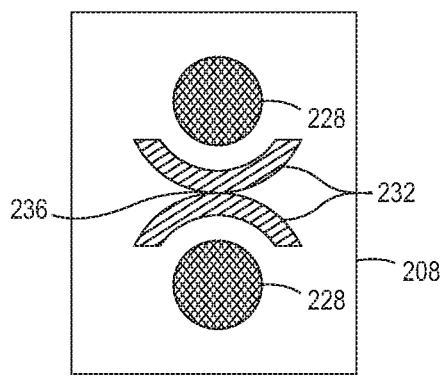
FIG. 3C is an end view of an alternative embodiment of the heater at the same position at which FIG. 3A was taken that reduces the width of the heater.

FIG. 2A is a longitudinal cross-sectional view of the heater 208 from a position past the cooling fins 236 to the exit position for the thermoplastic material. While the embodiments shown in FIG. 2A to 2C and in FIG. 3A to 3C are depicted as two piece configurations assembled with fasteners, the heaters could be formed as an integral unit. For example, the heaters could be formed as an integral unit using an additive manufacturing system, such as direct metal laser sintering (DMLS) system, or by a known casting process. FIG. 2A shows the lower half of the channel 232 that lies above one of the heating elements 228. The filament moves through the channel 232 as indicated by the arrow in the figure. As shown in the figure, the channel 232 is narrower where the filament enters the heated zone of the heater 208 and is wider at a position past the entrance. As depicted in FIG. 2B, one of the heating elements 228 is positioned beneath the lower half of the channel 232, which is circular at the entrance to the channel 232 when the upper half of the heater 208 is joined to the lower half depicted in the figure. As depicted in FIG. 2C, the heating element 228 remains beneath the channel 232, but the channel has increased in width, while its height is reduced. This change in the configuration of the channel 232 increases the surface area of the filament exposed to the heat generated by the heating element 228. The same is also true with regard to the upper half of the channel 232. This increase in surface area enables the heating elements 228 to thermal treat the filament more effectively so more of the cross-section of a filament can be thermally processed, which reduces the amount of time previously required for thermally treating the filament. The fasteners 230 join the two halves of the heater 208.

FIG. 3A shows the assembled heater 208 at the position depicted in FIG. 2C. Again, the rectangular shape at this location in the channel 232 has a height that is less than the diameter of the circular entrance and a width that is greater than the diameter of the circular entrance. Thus, the rectangular channel shape of FIG. 3A increases the surface area of the filament in channel 232 to increase the exposure of the filament to heat over the heat exposure of the filament that occurs if the channel remained circular as it is at the entrance. Although the channel in FIG. 3A is depicted as being rectangular, it could be any polygonal shape as long as the height of the polygon is less than the diameter of the circular entrance and the width of the polygon is greater than the diameter of the circular entrance. To reduce the dimensions of the heater 208 further, the channel 232 is configured with a non-circular curved shape, such as the semi-circular shape shown at the position depicted in FIG. 3A to widen the channel 232 at that position as shown in FIG. 3B. As used in this document, the term "non-circular curved shape" means any shape formed by a radius from the center of the channel in the heater that varies in length and is perpendicular to the longitudinal axis of the channel. Because the distance from one end of the semi-circular shaped channel to the other end of the semi-circular shaped channel is less than the end-to-end distance of the rectangular channel shown in FIG. 3A, while the height of the heater remains the same, the heater 208 in FIG. 3B consumes less space than the heater in FIG. 3A. FIG. 3C shows another alternative embodiment in which channel 232 is configured with a pair of semi-circular shaped channels to further increase the surface area of the filament and enhance the exposure of the increased surface area of the filament to the heat provided by the two heating elements 228, while further reducing the width of the heater 208. The two semi-circular shaped channels are joined together at intersection 236 to enable the extrusion material to spread into each semi-circular shaped channel.

Figure 6:
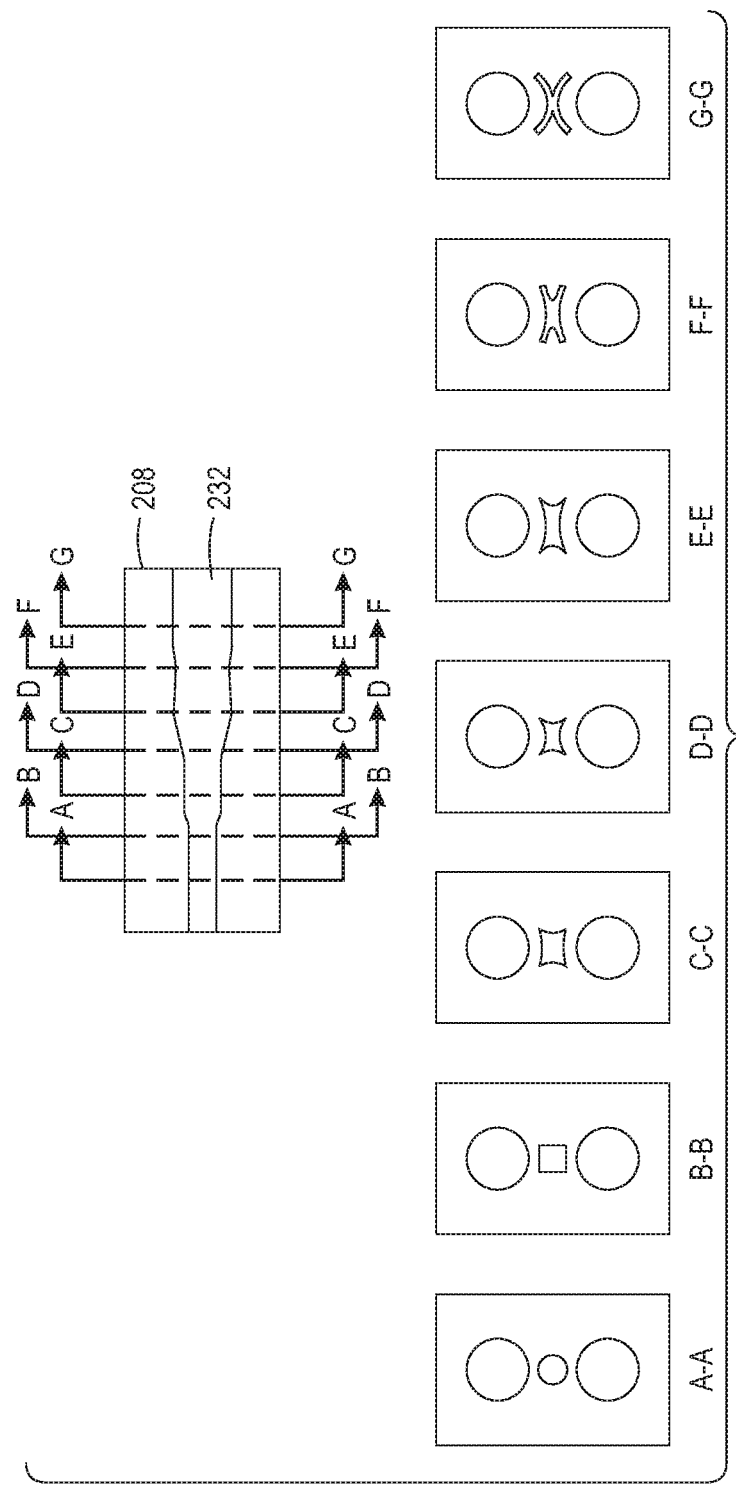
FIG. 6 is a side cross-sectional view of a heater that can be formed with an additive manufacturing or casting process with cross-sectional views of the channel through the heater at different positions along the channel.

FIG. 6 depicts a side cross-sectional view of an embodiment of a heater 208 that is formed as an integral unit with an additive manufacturing or casting process. These processes are capable of forming the channel with walls having varying curvatures. Beneath the side cross-sectional view of the heater in FIG. 6 are cross-sectional views of the channel 232 through the heater at different positions A-A to G-G along the channel. Thus, a heater 208 formed as an integral unit can have a channel 232 that varies in curvature along at least a portion of the length of the channel from one end of the channel to the other end of the channel to further improve the thermal processing of the filament within the heater. As used in this document, the term "integral unit" refers to a heater formed with single piece construction that does not require fasteners to assemble the heater. Also, as used in this document, "varies in curvature" means that the slope of the wall or walls of a channel within a heater changes in slope in either the longitudinal direction or cross-longitudinal direction or both directions simultaneously.

The depiction presented in FIG. 6 shows a variety of channel cross-sections that can be formed with additive manufacturing or casting processes. The reader should note that the channel in general begins with a circular cross-sectional area that receives extrusion material filaments. The cross-sectional area of the channel then changes to increase the surface area for facilitating the transfer of heat to the filament for the production of thermoplastic material. In most embodiments, the cross-sectional area of the channel then returns to a cross-sectional area shape and size that is compatible with the port in the extruder head that receives the thermoplastic material and directs it to the manifold in the head. This configuration enables the output of the heater 208 to be coupled directly to the extruder head 108 without an intervening fitting.

Figure 4:
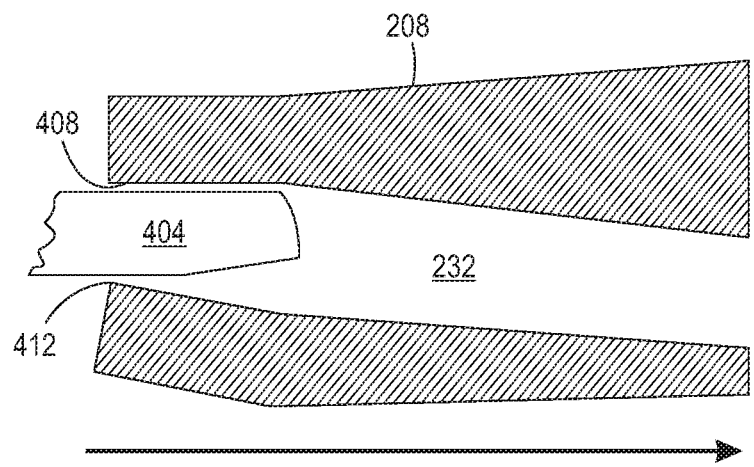
FIG. 4 is a side view of a longitudinal cross-section of an alternative embodiment of the heater that improves the thermal treatment of filaments for the provision of thermoplastic material to a manifold of an extruder head that can be used in the system of FIG. 1.

Another alternative embodiment of a channel configuration in a heater is shown in FIG. 4. Again, a channel 232 receives a filament 404 having a circular cross-section as the filament is moved in the direction indicated by the arrow in the figure. The heating elements 228 are not shown in the figure to simply the depiction, but are present as previously shown on either side of the channel. The upper wall 408 of the channel 232 is parallel to the upper surface of the filament 400, but the channel is also configured to begin increasing the width of the filament as described above. That is, the channel is configured at that position to change the filament of extrusion material to have a height that is less than the height of the filament when it entered the heater 208 and a width that is greater than the width of the filament when it entered the heater 208. Additionally, the lower wall 412 of the channel 232 is canted at a predetermined angle with regard to the upper surface of the filament to urge the lower surface of the filament toward the upper surface of the channel. This urging of the stiff center portion of the filament 404 toward the wall 408 exposes the center portion to the heated wall 408 so it bends under the pressure. Consequently, the center portion of the filament 404, which is the coldest portion of the filament, continues to move toward the upper wall 408 of the channel 432, which reduces the time required to transition the filament into thermoplastic material.

Figure 5:
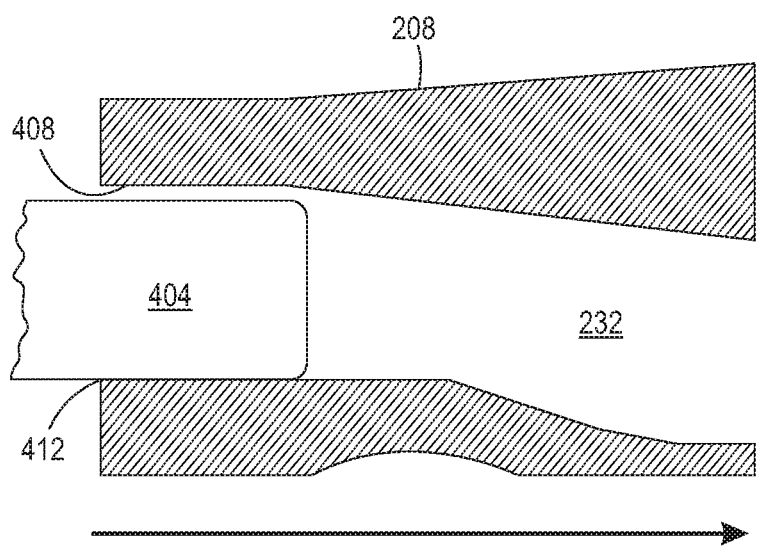
FIG. 5 is a side view of a longitudinal cross-section of another alternative embodiment of the heater that improves the thermal treatment of filaments for the provision of thermoplastic material to a manifold of an extruder head that can be used in the system of FIG. 1.

Another alternative embodiment of a channel configuration in a heater is shown in FIG. 5. Again, a channel 232 receives a filament 404 having a circular cross-section as the filament is moved in the direction indicated by the arrow in the figure. The heating elements 228 are not shown in the figure to simply the depiction, but are present as previously shown on either side of the channel. The upper wall 408 of the channel 232 is parallel to the upper surface of the filament 400, but the channel is also configured to begin increasing the width of the filament as described above. That is, the channel is configured at that position to change the filament of extrusion material to have a height that is less than the height of the filament when it entered the heater 208 and a width that is greater than the width of the filament when it entered the heater 208. Additionally, the structure of the channel 232 shifts inwardly and outwardly in a direction perpendicular to the regions of the filament 404 that are being flattened. The shifting in the walls of the channel causes different portions of the filament to move toward the walls of the channel. The movement of the different portions use the feeding force on the filament and the stiffness of the cold portion to induce mixing of the thermoplastic material in the channel to convert the filament to thermoplastic material more efficiently. Specifically, the downwardly sloping wall 408 helps push thermoplastic material to the side of the channel 232 while the colder center portion of the filament 404 continues in a straight line. This displacement of the thermoplastic material to the sides of the channel continues until the lower wall 412 begins to slope downwardly as well. As the thermoplastic material falls away from the colder center portion of the filament, the center portion is exposed to the heat from at least the upper wall 408. This exposure hastens the transformation of the center portion of the filament into thermoplastic material.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A heater for converting extrusion material to thermoplastic material comprising:
    a body having an inlet that is fluidly connected to an outlet by a channel within the body, the channel being configured with a first cross-sectional shape at a first position between the inlet and the outlet and with a second cross-sectional shape at a second position between the first position and the outlet, the second cross-sectional shape being configured differently than the first cross-sectional shape to increase a surface area of extrusion material in the channel as the extrusion material passes through the channel from the first position to the second position, the second cross-sectional shape having a height between a first wall of the channel and a second wall of the channel that are located on opposite sides of a geometric center of the channel that is less than a height of the first cross-sectional shape between the first wall of the channel and the second wall of the channel that are located on opposite sides of the geometric center of the channel, and the second cross-sectional shape having a width that is greater than a width of the first cross-sectional shape; and
    at least one heating element positioned in the body to generate heat in the channel and melt the extrusion material to form thermoplastic material before the extrusion material reaches the outlet.

2. The heater of claim 1 wherein the first cross-sectional shape of the channel at the first position is circular and the second cross-sectional shape of the channel at the second position is a polygonal cross-sectional shape.

3. The heater of claim 1 wherein the first cross-sectional shape of the channel at the first position is circular and the second cross-sectional shape of the channel at the second position is a non-circular curved cross-sectional shape.

4. The heater of claim 1 wherein the first cross-sectional shape of the channel at the first position is circular and the second cross-sectional shape of the channel at the second position is a pair of non-circular curved cross-sectional shapes.

5. The heater of claim 4 wherein the pair of non-circular curved cross-sectional shapes are joined together at an intersection to spread the extrusion material into each non-circular curved cross-sectional shaped channel.

6. The heater of claim 5 wherein the intersection between the pair of non-circular curved cross-sectional shapes occurs at a middle of each non-circular curved cross-sectional shape.

7. The heater of claim 1 wherein a wall of the channel at the first position is further configured to slope at a predetermined angle away from a surface of the extrusion material.

8. The heater of claim 1 wherein the heater is an integral unit and the channel within the heater varies in curvature along at least of portion of a length of the channel from the first position to the second position.

9. The heater of claim 1, the body of the heater further comprising:
    a first longitudinal portion and a second longitudinal portion, the first and the second longitudinal portions being configured to mate with one another to form the channel; and
    at least one fastener configured to secure the first longitudinal portion and the second longitudinal portion together to form the channel.

10. The heater of claim 9 wherein the at least one heating element is embedded within one of the first longitudinal portion and the second longitudinal portion.

11. The heater of claim 10 wherein the at least one heating element is a pair of heating elements with a first heating element being embedded within the first longitudinal portion and a second heating element being embedded in the second longitudinal portion.

12. The heater of claim 10 wherein the at least one heating element is an electrically resistive heating element.

13. The heater of claim 12 wherein the body of the heater consists essentially of stainless steel.

14. The heater of claim 1, the channel having three or more cross-sectional shapes between the inlet and the outlet, each of the cross-sectional shapes being different from one another.

15. The heater of claim 1, the outlet of the channel being further configured to be compatible with a port on an extruder head to direct thermoplastic material directly from the outlet into the port without an intervening fitting.

* * * * *